Dec. 8, 1964  I. FISKE  3,159,942

TALKBACK OR ECHO DOLL AND APPARATUS

Filed July 31, 1961  2 Sheets—Sheet 1

INVENTOR
Irving Fiske
BY
ATTORNEY

Dec. 8, 1964          I. FISKE          3,159,942

TALKBACK OR ECHO DOLL AND APPARATUS

Filed July 31, 1961          2 Sheets-Sheet 2

INVENTOR
Irving Fiske
BY
ATTORNEY

United States Patent Office 3,159,942
Patented Dec. 8, 1964

3,159,942
TALKBACK OR ECHO DOLL AND APPARATUS
Irving Fiske, Quarry Hill, Rochester, Vt.
Filed July 31, 1961, Ser. No. 128,937
6 Claims. (Cl. 46—232)

This invention generally relates to talkback or echo dolls, and more particularly to dolls having apparatus within the inside thereof for receiving and repeating back the human voice.

An object of this invention is to provide a doll in human or quasi-human form; or in the form of an animal, bird, or similar object; with self-contained apparatus for receiving and speaking back the human voice or other sound, although the apparatus itself provides an attractive and useful plaything or device for a child or other person, even when not contained within a doll.

Another object of this invention is to provide a doll with self-contained apparatus for receiving and speaking back the human voice after a suitable interval of time.

Still another object of the invention is to provide a doll to which a child or other person can talk, and the doll, after an interval of a fraction of a second to several seconds or more, or after any desired interval of time, repeats the words aloud.

These objects are achieved by fully electronic means, by combined electronic and mechanical means, or by purely mechanical means, as hereinafter described and shown.

These objects together with other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 1:
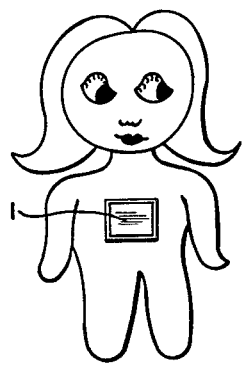
FIGURE 1 is a front view of a doll in human or quasi-human form, embodying my talkback or echo apparatus.
Figure 2:
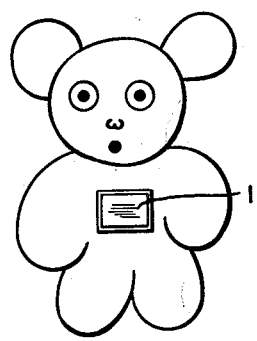
FIGURE 2 is a front view of a doll in animal form, embodying my talkback apparatus.
Figure 3:
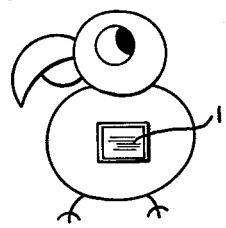
FIGURE 3 is a front view of a doll in bird form, embodying my talkback apparatus.

In carrying out the invention, referring now specifically to the drawing, self-contained talkback apparatus 1 is embodied in a doll of human or quasi-human form, as illustrated in FIG. 1. Talkback apparatus 1 is embodied in a doll of animal form, as shown in FIG. 2. Talkback apparatus 1 is embodied in a doll of bird form, as shown in FIG. 3.

Figure 4:
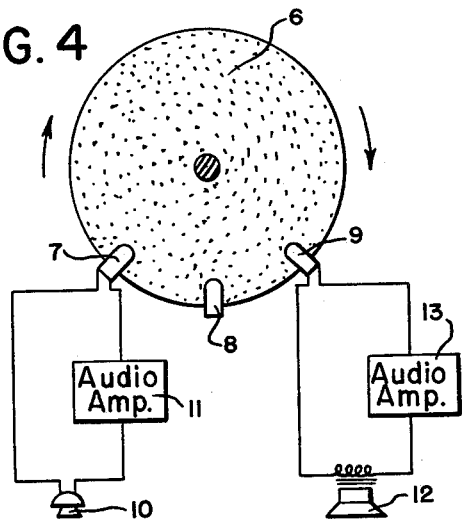
FIGURE 4 is a top view of the essential working parts of a combined electronic and mechanical form of my talkback apparatus for producing the talkback effect in the doll.

The form of my self-contained talkback apparatus using combined electronic and mechanical means, illustrated in FIG. 4, consists of a flat, magnetizeable and de-magnetizeable disc 6, made of magnetizeable metal, or of plastic, paper, or any substance with magnetizeable particles contained therein, and rotating uni-directionally as shown by the directional arrows, although rotation may be in either direction. Rotation of disc 6 is effected by means of a battery motor, or by other electrical or mechanical means.

Electronically conjoined with disc 6 is microphone 10, electrically connected to electromagnetic recording-head 7, through transistor or vacuum-tube audio-amplifier 11, which may either be used or not used, as desired. Also electronically conjoined are electromagnetic pickup-head 9, magnetic or electromagnetic erasing-head 8, loudspeaker 12, and transistor or vacuum-tube audio-amplifier 13. Electromagnetic recording-head 7, magnetic or electromagnetic erasing-head 8, electromagnetic pickup-head 9, and transistor or vacuum-tube audio-amplifiers 11 and 13 are all conventional and well-known parts and devices, and are therefore not shown or described in detail.

In operation, the human voice, or other sound, is transmitted by microphone 10 to electromagnetic recording-head 7, either through audio-amplifier 11, or without audio-amplifier 11, as desired. The voice or other sound is thereby electromagnetically impressed upon rotating magnetizeable disc 6, carried by rotating disc 6 to electromagnetic pick-up head 9, and electromagnetically picked up and transmitted by pickup-head 9 to loudspeaker 12 and played back by loudspeaker 12, through transistor or vacuum-tube audio-amplifier 13, which may not be used, as desired. The disc 6 then moves from pickup-head 9 to magnetic or electromagnetic erasing-head 8, which erases all voice-recordings on the disc at this point, thereby permitting the disc 6 to present a fresh, unrecorded area to recording-head 7. In this way, the human voice or other sound may be recorded, played back, and erased, over and over again, on the same disc, indefinitely, either automatically, or manually, as desired.

The time-interval between recording and playback depends directly on the speed of rotation of disc 6, and by adjusting speed of rotation of disc 6, or by starting and stopping disc 6, the apparatus may be adjusted to provide any time-interval from a fraction of a second to several seconds or more, or any desired interval of time.

The use of the magnetizable disc 6, herein shown, obviates the necessity, as in the conventional tape-recorder or wire-recorder, of recording by running a tape or wire in one direction, then having to rewind the tape or wire in the opposite direction, and then again having to run the tape or wire in the first direction, in order to obtain playback; and thereby provides a greatly simplified and entirely new principle of sound recording and playback.

Figure 5:
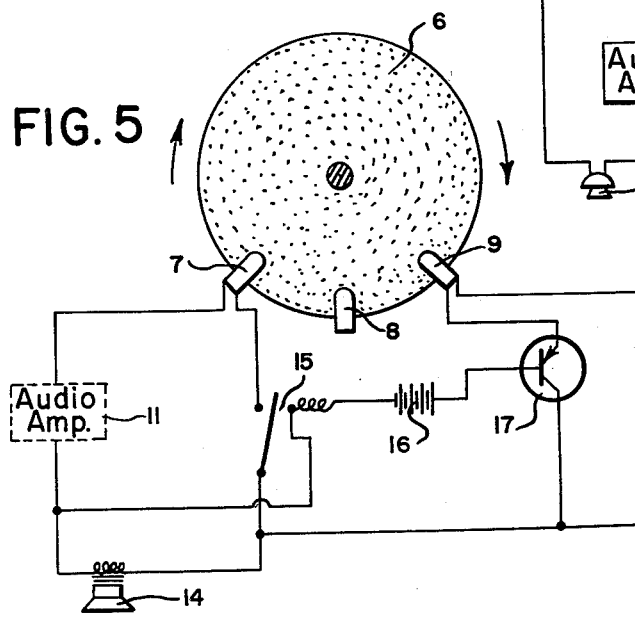
FIGURE 5 is a top view of the essential working parts of a variation of the combined electronic and mechanical apparatus for producing the talkback effect in the doll.

A combined electromagnetic microphone-and-loudspeaker 14, illustrated in FIG. 5, optionally takes the place of separate microphone and speaker, thus further simplifying operation. The combined electromagnetic microphone-and-loudspeaker 14 are electrically connected with an electromagnetic cut-out 15, battery 16 (or other source of electric current), transistor or vacuum-tube 17, electromagnetic recording-head 7, magnetic or electromagnetic erasing-head 8, electromagnetic pickup-head 9, and optional transistor or vacuum-tube audio-amplifier 11, which may or may not be used, as desired.

In operation, voice or sound are transmitted by the combined electromagnetic microphone-and-loudspeaker 14 to electromagnetic recording-head 7, optionally either with or without the use of audio-amplifier 11. The voice or sound are thereby electromagnetically impressed on rotating disc 6, carried by rotating disc 6 to electromagnetic pickup-head 9, and electromagnetically picked up and transmitted through, and amplified by transistor or vacuum-tube 17 to magnetic-coil section of electromagnetic cut-out 15, thereby cutting out the recording section of the circuit, and allowing the combined microphone-and-loudspeaker 14 to function as a loudspeaker only. The apparatus is thereby automatically prevented from recording at the same time it is playing back, since the cut-out 15 is automatically actuated by the operation of the playback circuit, and can therefore record only when it is not playing back. This assures smooth and efficient operation of the talkback apparatus, even when a combined microphone-and-loudspeaker are used.

Figure 6:
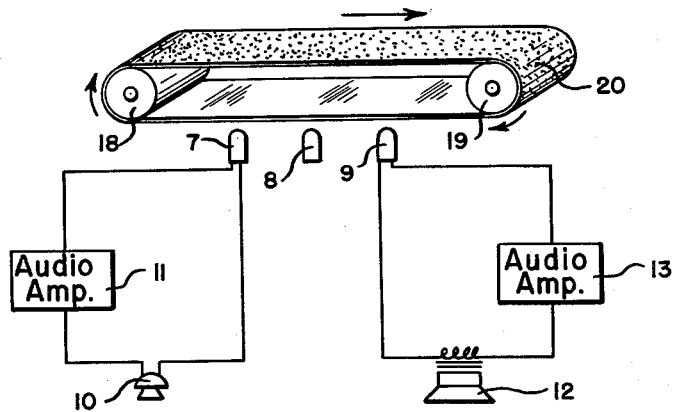
FIGURE 6 is a combined perspective and electrical-schematic view of another form of my combined electronic and mechanical talkback apparatus for producing the talkback effect in the doll.

A magnetizeable and de-magnetizeable endless belt or tape 20, shown in FIG. 6, is used in conjunction with rollers 18 and 19, to provide the same talkback effect. Direction of rotation is as shown by the arrows, but may be in either direction. Voice or sound is transmitted by microphone 10 to electromagnetic recording-head 7, electromagnetically impressed on endless belt or tape 20, which then moves to electromagnetic pickup-head 9, then transmitted to and played back by loudspeaker 12. Use of audio-amplifiers 11 and 13 again is optional. The belt or tape 20 then moves to erasing-head 8, where all voice or sound-recordings are erased, thus permitting belt or tape 20 to present again a fresh, unrecorded area to recording-head 7.

Figure 7:
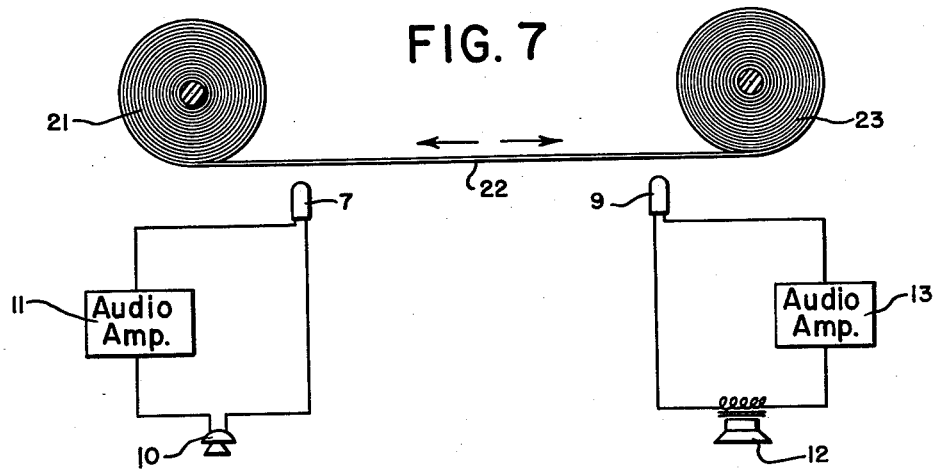
FIGURE 7 is a combined top and electrical-schematic view of still another form of my talkback apparatus.

An electromagnetic plastic or paper recording-tape 22, illustrated in FIG. 7, is used optionally without an erasing-head to obtain a permeant record, if desired, of the recorded and played-back voice or sound. Voice or sound is transmitted, as before, by microphone 10 to electromagnetic recording-head 7, electromagnetically impressed on recording-tape 22, picked up by pickup-head 9, and then transmitted to and played back by loudspeaker 12. Use of audio-amplifiers 11 and 13 is again optional. The recording-tape 22 is unwound from spool 21 and wound onto spool 23, and in this way the tape 22, with voice or sound still recorded on it, and unerased, is stored on spool 23 for future repeat playback, if desired.

Figure 8:
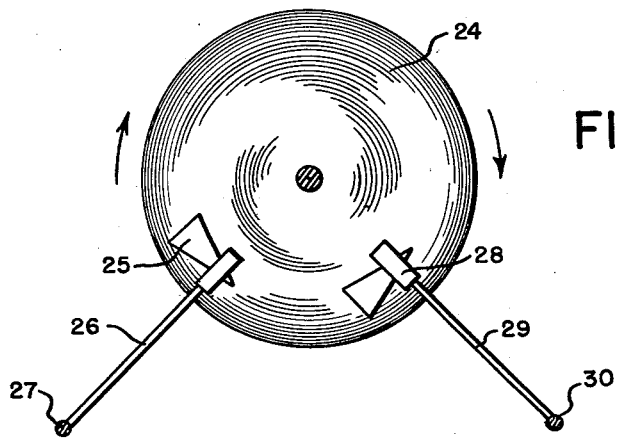
FIGURE 8 is a top view of another, purely mechanical and phonographic form of my talkback apparatus.

A purely mechanical form of my self-contained talkback apparatus, illustrated in FIG. 8 consists of a conventional phonograph record-disc 24, with grooves spirally or otherwise arranged, in the conventional manner. Cutting-head 25 is mounted on arm 26, and pivots on pivot 27. Phonographic playing-head 28 is mounted on arm 29, and pivoted on pivot 30. Voice or sound are received and mechanically impressed by cutting-head 25, by means of its cutting-needle, on record-disc 24, which then moves to phonographic playing-head 28, which plays back the phonograph recording in the conventional manner. Recordings are not erased, but are spirally recorded until the entire phonograph record-disc 24 is filled, whereupon the entire disc may be played back without further recording, if desired. A new phonograph record-disc 23 is inserted, of course, if new recordings and talkback or "echo" playbacks are desired.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

Having thus completely and fully described the invention, what is now claimed as new is as follows:

1. An audio device in combination with a figurine comprising:
   (a) a body portion configured to represent said figurine;
   (b) sound detecting means positioned within said body portion for detecting an audible signal;
   (c) sound recording means operably associated with said sound detecting means for recording the audible signal detected by said sound detecting means;
   (d) first circuit means operably associated with and between said sound detecting means and said sound recording means for translating said audible signal therebetween;
   (e) sound reproducing means operably associated with said sound recording means for reproducing the signal from said sound recording means following a predetermined interval subsequent to the recording of said audible signal by said sound recording means;
   (f) second circuit means operably associated with and between said detecting means and said reproducing means for translating said recorded signal from said reproducing means;
   (g) means for erasing said audible signal from said sound recording means subsequent to the reproduction of said audible signal therefrom;
   (h) sound amplifying means operably associated with said sound reproducing means for amplifying the audible signal recorded by said sound recording means;
   (i) energizing means for actuating said detecting, recording, reproducing, erasing and amplifying means; and
   (j) circuit selection means for receiving said recorded signal and for precluding the simultaneous operation of said sound detecting means and said sound reproducing means; said circuit selection means being operably associated with said first and second circuit means, and being so constituted and arranged as to enable the alternate de-energization thereof, and further enabling the energization of said sound reproducing means by the audible signal received by said sound detecting means.

2. An audio device in combination with a toy figurine according to claim 1 wherein said circuit selection means comprises an electro-magnetic switch adapted to alternately select the input and output portions of said recording and reproducing means respectively.

3. An audio device in combination with a toy figurine according to claim 1 wherein said sound detecting and said sound reproducing means comprise at least one speaker-microphone member.

4. An audio device in combination with a toy figurine according to claim 1 wherein said erasing means comprises a magnetic head member.

5. An audio device in combination with a toy figurine according to claim 1 wherein said recording means comprises a movable magnetized surface.

6. An audio device in combination with a figurine comprising:
   (a) a body portion configured to represent said figurine;
   (b) sound detecting means positioned within said body portion for detecting an audible signal;
   (c) sound recording means operably associated with said sound detecting means for recording the audible signal detected by said sound detecting means;
   (d) first circuit means operably associated with and between said sound detecting means and said sound recording means for translating said audible signal therebetween;
   (e) sound reproducing means operably associated with said sound recording means for reproducing the signal from said sound recording means following a predetermined interval subsequent to the recording of said audible signal by said sound recording means;
   (f) second circuit means operably associated with and between said detecting means and said reproducing means for translating said recorded signal from said reproducing means;
   (g) energizing means for actuating said detecting, recording and reproducing means; and
   (h) circuit selection means for receiving said recorded signal and for precluding the simultaneous operation of said sound detecting means and said sound reproducing means;

said circuit selection means being operably associated with said first and second circuit means, and being so constituted and arranged as to enable the alternate de-energization thereof, and further enabling the energization of said sound reproducing means by the audible signal received by said sound detecting means.

References Cited by the Examiner
UNITED STATES PATENTS

| | | | |
|---|---|---|---|
| 2,105,904 | 1/38 | Dale | 46—232 |
| 2,324,774 | 7/43 | Henry | 46—171 |
| 2,380,392 | 7/45 | Begun | 274—46.4 |
| 2,555,800 | 6/51 | Levine | 46—232 |
| 2,942,380 | 6/60 | Coulter | 46—232 |
| 2,957,273 | 10/60 | Hughes et al. | 46—236 |
| 2,983,794 | 5/61 | Shields | 179—100.2 |
| 3,002,055 | 9/61 | Gunby | 179—100.2 |

RICHARD C. PINKHAM, *Primary Examiner.*

DELBERT B. LOWE, *Examiner.*